United States Patent
Steen, III et al.

(10) Patent No.: US 6,510,350 B1
(45) Date of Patent: Jan. 21, 2003

(54) REMOTE DATA ACCESS AND SYSTEM CONTROL

(76) Inventors: Henry B. Steen, III, 1506 Greenmeadow Ct., Bowling Green, KY (US) 42014; Cecil D. Martin, Jr., 608 Griffith Ave., Owensboro, KY (US) 42301; Edward A. Corlew, 100 Green Meadows Dr., Hendersonville, TN (US) 37075

(*) Notice: Subject to any disclaimer, the term of this patent is extended or adjusted under 35 U.S.C. 154(b) by 0 days.

(21) Appl. No.: 09/545,379

(22) Filed: Apr. 7, 2000

Related U.S. Application Data

(60) Provisional application No. 60/128,513, filed on Apr. 9, 1999, and provisional application No. 60/129,708, filed on Apr. 16, 1999.

(51) Int. Cl.[7] .............................................. G05B 15/02
(52) U.S. Cl. .......................................... 700/9; 702/188
(58) Field of Search ............................... 700/2, 19, 96, 700/241, 244, 9; 702/188

(56) References Cited

U.S. PATENT DOCUMENTS

| | | | | |
|---|---|---|---|---|
| 5,805,442 A | * | 9/1998 | Crater et al. | 700/9 |
| 5,845,230 A | * | 12/1998 | Lamberson | 702/56 |
| 5,895,457 A | * | 4/1999 | Kurowski et al. | 705/413 |
| 5,928,323 A | * | 7/1999 | Gosling et al. | 709/203 |
| 5,980,090 A | * | 11/1999 | Royal, Jr. et al. | 700/241 |
| 5,982,362 A | * | 11/1999 | Crater et al. | 345/327 |
| 6,038,486 A | * | 3/2000 | Saitoh et al. | 700/96 |
| 6,049,775 A | * | 4/2000 | Gertner et al. | 705/8 |
| 6,061,603 A | * | 5/2000 | Papadopoulos et al. | 700/83 |
| 6,098,093 A | * | 8/2000 | Bayeh et al. | 709/203 |
| 6,157,953 A | * | 12/2000 | Chang et al. | 709/225 |
| 6,201,996 B1 | * | 3/2001 | Crater et al. | 700/9 |

* cited by examiner

*Primary Examiner*—Thomas Black
*Assistant Examiner*—Edward F Gain, Jr.
(74) *Attorney, Agent, or Firm*—Sheldon H. Parker

(57) ABSTRACT

The disclosed system enables a user to monitor and control a remote equipment site from any remote location, over the Internet, while maintaining the operating software the system provider's server. All user data access is through the use of modules, or servlets, that prevent the provider's operating software from being directly accessed, thereby eliminating modification or alteration by any user. The system preferably provides several levels of access, through the use of access codes, to prevent unauthorized users from accessing information. The system communicates with remote units that are proximate the remote equipment and have communication capabilities to enable the remote units to have either one or two way communication with the provider software. The remote units have monitoring devices, that receiving status data from at least one piece of equipment for transmission to the provider software for storage and user access through the servlet(s). Each of the remote units is programmed by the user with definable maximums and minimums for data received from said monitoring means. If the values for a piece of equipment fall out of these ranges, the system provider is notified by the remote unit. The system provider can then notify the user through the use of a pager, cell phone, or other notification means. The provider software automatically contacts each of the remote units for each user, on a predetermined schedule, and updates data from each remote unit based. The provider software also enables either the user or the remote unit to request a data update in addition to the predetermined scheduled transmissions.

23 Claims, 11 Drawing Sheets

CyberSTAT
For Cybersensor Monitoring

| UNIT NAME | STATUS | LAST RECEIVED REPORT | REPORT STATUS | STATS GRAPH |
|---|---|---|---|---|
| Butler County PPS1 | No New Reports | 4/5/00 6:25:58 AM PDT | clear | --- |
| Well #3976 | No New Reports | 4/5/00 6:51:52 AM PDT | clear | --- |
| FloraPJC1 | No New Reports | 3/31/00 8:00:07 AM PST | ack | --- |
| Well 72-41-SX-10 | No New Reports | 4/5/00 6:26:17 AM PDT | clear | --- |
| Well #3044 | No New Reports | 4/5/00 4:27:10 PM PDT | clear | --- |
| Well 72-2-SX-10 | No New Reports | 4/5/00 6:32:25 AM PDT | clear | --- |
| BC well #10 | No New Reports | new | clear | --- |
| Nu-Metrics Test Unit | No New Reports | 2/25/00 1:45:44 PM PST | clear | --- |
| V 2838 | No New Reports | 4/5/00 12:32:33 PM PDT | clear | --- |
| KP 1160 | No New Reports | 4/5/00 12:25:58 PM PDT | clear | --- |
| VC-3007 | No New Reports | 4/6/00 9:19:52 AM PDT | error | --- |

Figure 6

CyberVIP

For Field Unit: Butler County PPSI

CyberSTAT

Access Tokens Remaining: 79

Send Log Files

Error Status

| Description | Last Updated |
|---|---|
| System Ok | 00 |
| Request Error Status | |

Error Reporting Control Panel

| Error Description | Report Status | Pager Status | Pagers | Update |
|---|---|---|---|---|

| PARAM NAME | VALUE | NEW VALUE | UNITS | LAST UPDATED | UPDATE |
|---|---|---|---|---|---|
| Outlet Pressure | 248.68 | ---------- | psig | 4/5/00 6:24:48 AM PDT | update |
| Liquid Level Sensor | 15.80 | ---------- | volts | 4/5/00 6:24:48 AM PDT | update |
| Compressor Pressure | 7.35 | ---------- | psig | 4/5/00 6:24:48 AM PDT | update |
| Inlet Pressure | 497.35 | ---------- | psig | 4/5/00 6:24:48 AM PDT | update |

Unit Configuration Form

Error Definitions

| Error Definition | New Error Definition |
|---|---|
| Compressor 1 Offline | |
| Compressor 2 Offline | |
| Compressor 3 Offline | |
| Compressor 4 Offline | |
| Compressor 5 Offline | |

Data Definitions

| Parameter Name | Units | New Parameter Name | Sensor | New Sensor |
|---|---|---|---|---|
| Report Time | Hours | | none | none |
| Enable\Disable Error Reports | units | | none | none |

Device Definitions

| Current Unit Name | New Unit Name |
|---|---|
| Tim Test Unit | |

[submit]

Account Setup

| | |
|---|---|
| Enter ORBCOMM Surname: | |
| Enter Desired Unitname: | |
| Enter Unit Serial Number: | |
| Enter Customer ID: | |
| Enter Date: | |
| Select Account Action: | ○ Add    ○ Delete |
| Pager Service: | ○ Yes    ○ No |
| Select User Application: | Pump Jack Controller |

[Create/Delete Account]

REMOTE DATA ACCESS AND SYSTEM CONTROL

CROSS-REFERENCE TO RELATED PATENT APPLICATIONS

The present application claims the benefits under 35 U.S.C. 110(e) of provisional patent application serial No. 60/128,513 filed Apr. 9, 1999 and No. 60/129,708 filed Apr. 16, 1999. This application incorporates by reference, as though recited in full, the disclosure of the foregoing co-pending patent applications.

FIELD OF THE INVENTION

The invention relates to the remote access of data and system control, and more particularly, to a web-based and satellite interactive system for remote accesses of data.

BACKGROUND OF THE INVENTION

Data access and remote control of process equipment have been primary areas of activity for computer design engineers and programmers. Many systems are custom designed to meet the customer's particular needs, however this customization is expensive, making it out of financial reach for small companies. In systems that are not custom designed, existing remote telemetry and control solutions require an excessive hardware and software investment.

A serious, and persistent problem with the remote downloading of data files or the remote control of process equipment is the ability of unauthorized third parties to gain access to the data or equipment. Encryption techniques have been employed to safe guard data from unauthorized access, however this is not a total solution. Encryption has limited value in those circumstances where there is a large number of authorized parties and the encryption cannot be readily customized for each user.

SUMMARY OF THE INVENTION

The disclosed system enables a user to monitor and control a remote equipment site from any remote location. Preferable this is accomplished through the use of Internet access to a website at the system provider's server, although other methods can be used. The disclosed monitoring system maintains the operating software on the primary site, that is, on the system provider's server and data is available to customers only through the provider's software. All data access is through the use of modules, or servlets, preventing the provider's operating software from being directly accessed, thereby eliminating modification or alteration by any user, authorized or unauthorized. For simplicity, in this document, any reference to satellite communication technology shall be deemed to include satellite, cellular, R.F, terrestrial or non-terrestrial communication networks.

To monitor and control the remote equipment, the system uses a central server containing provider software database which has storage and communication capabilities to store, sort and display data and is accessible by a user from a remote location. Preferably the information is accessed over the Internet, through use of a computer, enabling the user to interact with the providers web site. The software uses at least one servlet as an interface between the users and the provider software, to prevent direct user access to the software. The software also monitors the user's transmission time and type in order to charge the user. The system communicates with remote units that are proximate the remote equipment and have communication capabilities to enable the remote units to have two way communication with the provider software. The remote units have monitoring devices, such as sensors, that communicate with the remote equipment, receiving status data from the equipment. Each remote unit has the capability to receive data from multiple pieces of equipment for forwarding to the provider software. The remote unit transmits the data from the monitoring devices to the provider software for storage and user access through the servlet(s). Each of the remote units is programmed with definable maximums and minimums for data received from said monitoring means. These maximums and minimums are initially defined, and can be redefined subsequently, by the user. If the values for a piece of equipment fall out of these ranges, the system provider is notified by the remote unit. The system provider can then notify the user through the use of a pager, cell phone, or other notification means.

The system preferably pro,ides several levels of access, through the use of access codes, to prevent unauthorized users from accessing information. In the preferred embodiment these are read; read/write and administrative level, with each of level respectively increasing access to the data.

In the preferred embodiment, the system is accessed through a web site having multiple display pages that display the data transmitted from the remote units. The display pages are accessed and displayed through use of the servlet(s). The displayed format and data are defined by the user and can include a summary page listing the status data for all remote units; a detailed data page listing predetermined detailed data for one remote unit; and an error data page listing predetermined error data for one remote unit. The user configures the system through use of a data configuration page that enables a user to define the parameters for each monitoring device and a data setup page that enables a user to customize data and select from predefine parameters for each monitoring device The data can be transferred either by the remote unit automatically contacting the provider software, based upon a user define schedule, or the provider software can contact each of the remote units for each user. The provider software can contact the remote unit on a predetermined schedule and/or upon user request. The system provides the user with the ability to redefined the schedule. Preferably the updates are automatically received from the remote units to minimize satellite time.

BRIEF DESCRIPTION OF THE DRAWINGS

FIG. 6 is an example of a CyberSTAT summary screen;

FIG. 7 is an example of a portion of a virtual instrument panel;

FIG. 12 is an example of a unit configuration screen; and

FIG. 13 is a example of an account setup screen.

DESCRIPTION OF THE PREFERRED EMBODIMENTS AND BEST MODES OF THE INVENTION

Figure 1:
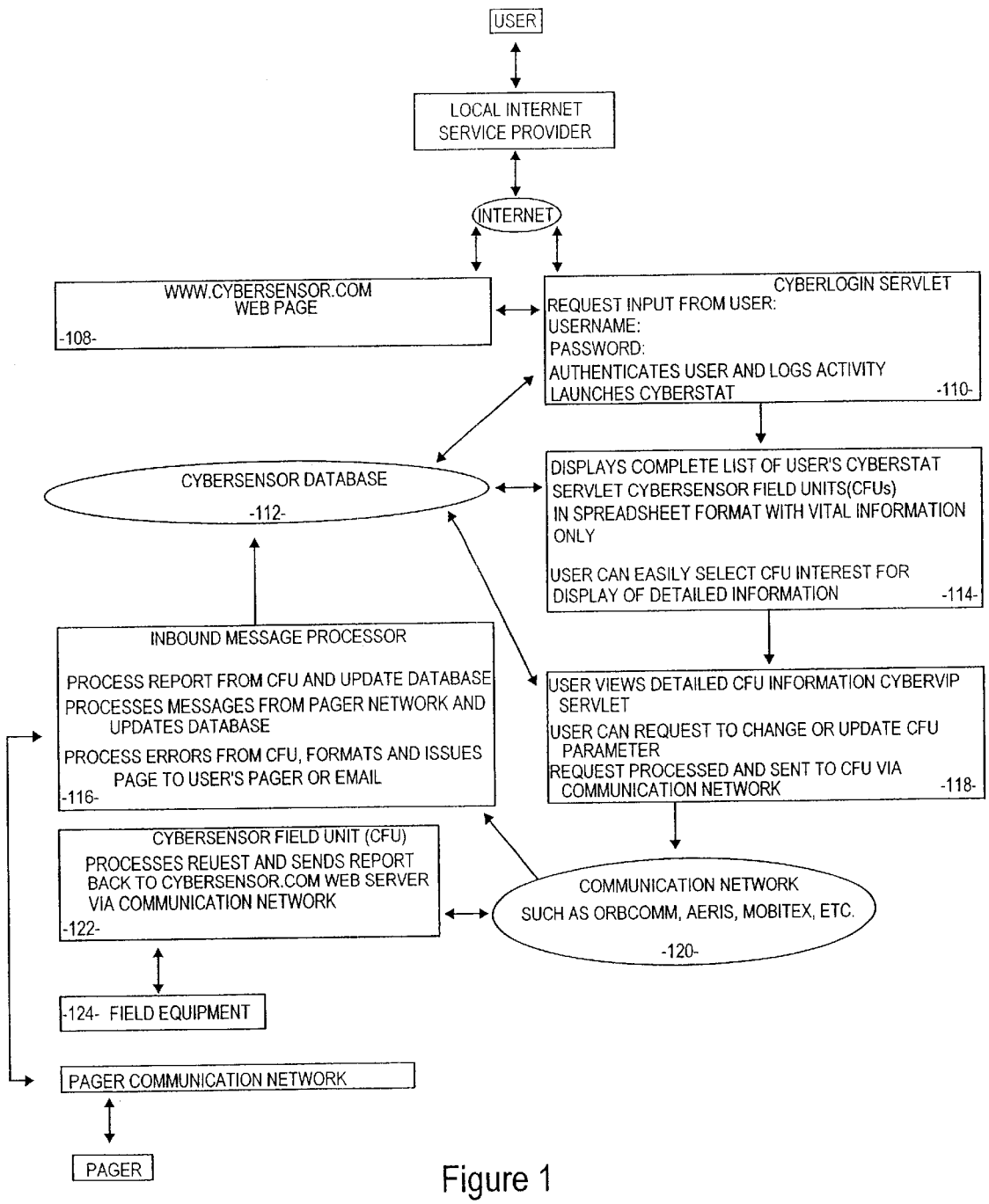
FIG. 1 is a flow chart of the system information accessing process.

The disclosed system enables a user to monitor and control a remote equipment site from any remote location. Preferably this is accomplished through the use of Internet access to a website at the system provider's server, although other methods can be used. The disclosed monitoring system maintains the operating software on the system provider's server and data is available to customers only through the provider's software. All data access is through the use of modules, or servlets, preventing the provider's operating software from being directly accessed, thereby eliminating modification or alteration by any user, authorized or unauthorized. For simplicity, in this document, any reference to satellite communication technology shall be deemed to include satellite, cellular, R.F, terrestrial or non-terrestrial communication networks.

The use of the term servlet or module herein is not indicative of any specific operating program or programming language. Although many servlets are written in Java, any language that interacts with the server database platform can be used. The novelty of the system lies in the removal of the operating software from the user and placing all operation in the provider's system. The servlets merely provide independent action modules that serve to interface between the user and the provider's database, providing additional security and ease of use.

The servlets used in the disclosed system are written to be very generic, thereby meeting most of the customer's needs. Illustrations of several servlets and how they can be used to either gather data or launch systems are as follows:
1. Running Continuously or Timer Launched:
   ProcessMAIL: processes incoming messages from the field unit and updates database.
2. Running Continuously or Timer Launched:
   SendPage: sends a alarm or error page to a user's pager network based upon status in database.
3. CyberLOGIN: Authenticates the user
   Launches:
   CyberSTAT: provides summary information about the user's field units
   Launches:
   CyberGRAPH: displays graph of histogram data associated sensor values or statistical information
   CyberVIP: displays values of sensor inputs and all parameters associated with a particular field unit
   Launches:
   CyberSEND: sends request to update a field parameter or request for up-to-date sensor data, etc.
   CyberLOG: sends receive and send log files to the user's email address
   RESET: sends a special software reset to the field unit
   STATUS: sends a request for system status to the field unit
   ErrorStatus: processes data relating to error reporting control panel configuration It should be noted that the foregoing servlets are for example only and other servlets to meet other criteria will be obvious to those skilled in the art. The user accesses the provider's web site through any web browser, as for example Netscape® and Internet Explorer®. Since the web site houses the servlets that function as the software for the system, the user's computer does not require software installation. In many applications, the servlets function as the software that provides the user interface to the database. In other cases, the software can be written in any appropriate language, for example C++, PERL or UNIX script, all of which can access the database if necessary. In addition to providing easy updating, the maintaining the operating software on the system provider's server increases security since all direct access with the actual database is internal. The servlets serve as a buffer between the database and the user.

The provider's system also enables application to application (machine to machine) database connectivity in several forms such as, but not limited to: ODBC, Streams and XML. This feature increases overall functionality and marketability. The field unit data is processed by the system provider's software, which in turn, can update the user's database. This system not only prevents inadvertent altering of the data by users, but provides an added measure of security from Internet associated break in.

Software on the provider's system enables the user to enter valid requests to change field unit parameters and/or configuration changes. These requests are processed accordingly and stored in the provider's database. Upgrades or modifications to the software are invisible to the user, since all changes to the operating software and servlets are made at the primary site.

All values received through the servlets and other modes of communication are stored in the database including configuration parameters In addition to storing data, the server database software preferably includes the following functions:
1. Provides a user interface to the data without local software;
2. Correlates internal and external data;
3. Provides graphs and histograms of internal and/or external data;
4. Provides an alarm or an error signal to the user's pager network for instant alert to alarm or error condition;
5. Provides a central data access point for multiple, simultaneous users.

The platform and programming of the database will be evident to those skilled in the programming arts.

In instances where the web site is providing control and data readings of equipment and/or systems located at user remote sites, the same security holds true. Data received from the software on the field unit at remote site is fed directly into the disclosed system, thereby placing the provider's database between the remote site and the user. Therefore, any modification of process equipment must be accomplished either directly at the physical site or through the system provider's server. Thus the servlets function as a firewall between the user, authorized or unauthorized, and the data and the remote equipment and/or systems. All changes can be stored in an event log both on the server and in the remote field equipment. This list can be made accessible from the user administrative account. Excessive changes can cause an alert message to be sent to the system administrator or the field unit's administrative contact person via email or pager. Also, procedures can be instituted that allow any changes made to the field unit's parameters locally, in the field, to be automatically uploaded to the server when the Internet becomes available to the field technician's computer. Remote users do not have to install any software on their computer except for a standard web browser.

In FIG. 1, the flow of information from the user, through the Cybersensor system to the field and back to the user is illustrated. For description herein, the solid boxes drawn in FIG. 1 contain finite and quantifiable hardware located at a particular location. The solid ellipses, for description purposes, are to be considered network "clouds". For example, the box depicting the Cybersensor Field Unit (CFU) 122 can consist of a satellite subscriber communicator and/or application processor and associated Cybersensor power/interface modules and sensors. The power/interface modules and sensors can be either located at a fixed site or mounted to a mobile vehicle. For example, the power/interface module can consist of a solid-state relay and contactor used to start and stop a large motor. An example of a sensor could be a tank level monitor or flow detector that is used for telemetry and/or to provide feedback to the local control system. Conversely, the ellipse depicting the communications network 120 includes hardware and software owned and operated by the communication network only. From the perspective of the disclosed system, it is only relevant for the input and output capabilities and will vary dependent upon the current applicable technology. In the preferred embodiments, the CFU 122 has the ability to receive from the Cybersensor server 100 as well as transmit. The critical feature is that the CFU 122 has programming capabilities that enable the CFU 122 to send data to the Cybersensor server 100 based upon a predetermined schedule. This schedule is defined, and can be redefined at any time, by the user and can be based upon a specific time, or times, of day or every preset number of hours. The configuration screen 212 of FIG. 12 enables the user to redefine the parameters stored in the CFU 122 from the user's computer. This enables the user to customize the delivery of data based upon their specific needs and type of application. Alternatively, the transmission schedule can be altered on site. The method of transferring data saves on the cost of satellite time; thus allowing the monthly provider's fees to be minimized.

In FIG. 1, the User has access to a personal computing device 102 and a pager 104. The personal computing device 102 is shown to connect to the Internet via a local Internet service provider. It should be noted that the Internet provider can be accessed via conventional phone lines or any available means currently in use, including wireless technology. Additionally, the data can be accessed through use of a palm pilot, telephone, or other communication device, having web connection capabilities. For example, a palm pilot can contain a script that enables either viewing in the same manner as with a computer or, alternatively, only displaying values programmed into the script. In this way, a user can rapidly access only critical values, completing a full review of the remote units from a computer. Updates can be obtained by phone by dialing an access number and user codes. Once the user is verified, the provider software can "read" the values over the phone. A menu can be used to select the type of equipment, remote unit location, etc.

Figure 4:
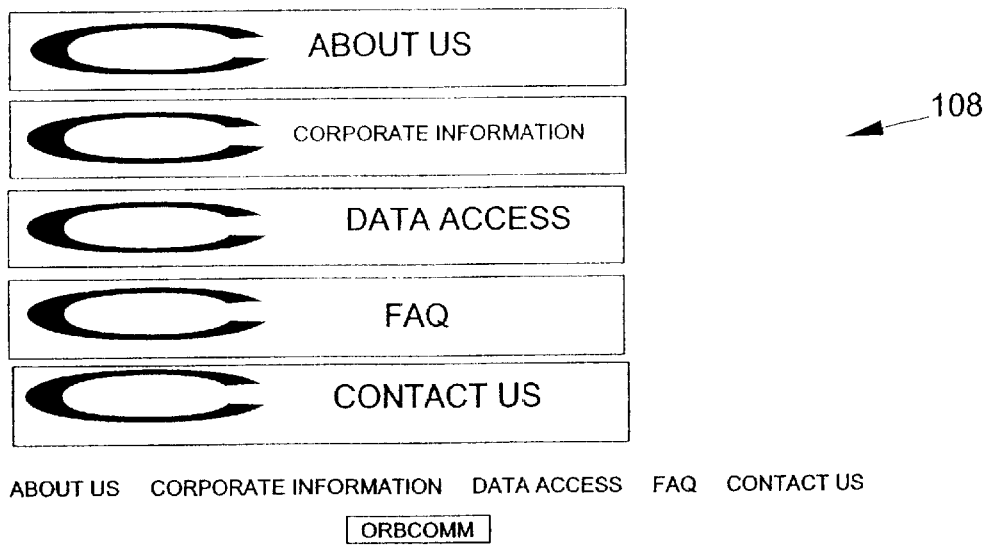
FIG. 4 is an example of an initial web page screen.

Once the user establishes a link to the Internet, he or she has access to the CyberLOGIN module 110 (FIG. 5) via the appropriate Internet address 108 (FIG. 4). The CyberLOGIN module 110 establishes a secure connection, using any current methods, such as Secure Socket Layer, SSL or Virtual Private Network, VPN, to the user's web browser and requires that the user authenticate via username, password and customer ID.

CyberLOGIN 110 authenticates the user by comparing login information to the information stored within the Cybersensor database 112. If the user is authenticated then the CyberLOGIN 110 servlet launches the CyberSTAT module 114 (FIG. 6). Failed attempts are processed and logged to the system log and the system administrator is alerted when the unsuccessful login attempts exceed a preset number. If automatic rejection is employed by the system administrator, after a preset number of failed attempt, the user will not be able to login even if the proper username, password and customer id is entered. The CyberSTAT module 114 accesses the Cybersensor database 112 and provides the user with a complete list of Cybersensor field units (CFUs). The summary information presented from the CyberSTAT module 114 reports error and/or statistical information related to each of the "User's" CFUs as listed in the unit column 62. This information is displayed in any number of formats, depending upon the user's requirements. The CyberSTAT module illustrated in FIG. 6 is a spreadsheet format, however any manner of graphical layout can be used, as well as 3D, virtual reality, holographic, pictorial or any other currently appropriate method that meets the requirements determined by the user.

Figure 3:
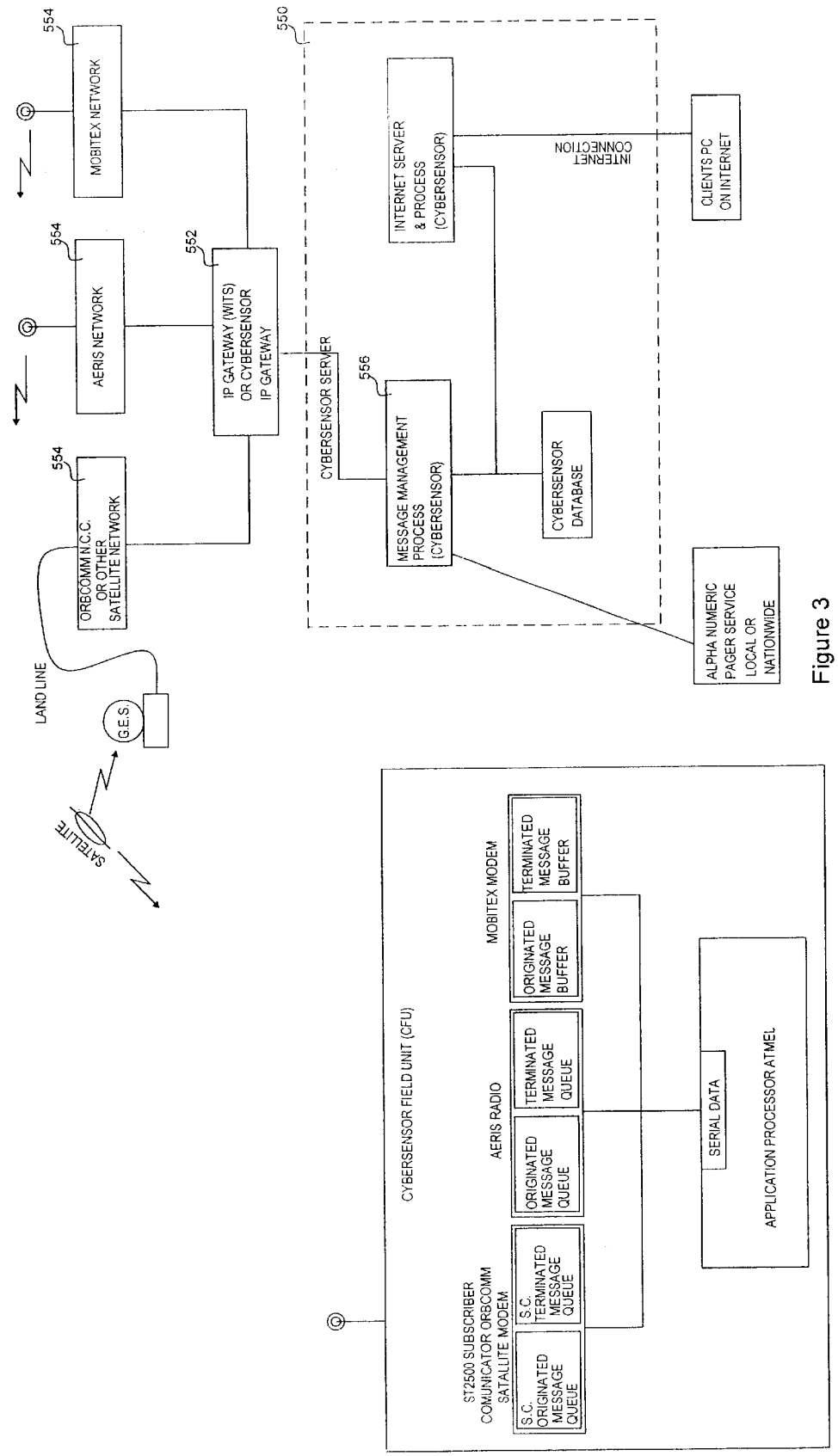
FIG. 3 is a flow chart of the system hardware and data flow; using generic satellite and various terrestrial network systems.

Detailed information related to a particular CFU and its associated field equipment can be accessed by clicking on the name field, or any object relating to that particular CFU located on the CyberSTAT page, thus launching the CyberVIP servlet 118. From the administrative user account, or unit configuration form, FIGS. 12 and 13, the CyberVIP servlet 118 (FIG. 6) can be configured to show or hide parameters and information relating to the CFU or connected Field Equipment. In addition to various display features, such as time zone, etc, the administrative control panel allows irrelevant information to be filtered and hence "hidden" from the Read/Write and Read-Only Accounts. The administrative control panel is used to configure all parameters associated with the user account, for example it can be used to select the type of communication network to be used. If coverage varies or the field unit is mobile, the order of network type and retry count can be set to accommodate the user. Normally, the user will access this information using the read-only or read-write account, as described further herein. If the user requests information from the CFU, the CyberVIP module 118 processes, formats and submits the information request to the appropriate communications network. This request can either be sent directly to the communication network 120 or passed to the Cybersensor Message Management Processor (CMMP) as shown in FIG. 3. The Cybersensor Message Management Processor (CMMP) can interactively manage messages sent to any communication Gateway. The most functionality is realized when the CMMP is connected to a manageable Gateway with an interactively managed message stack. The preferred machine-to-machine protocol used to communicate with the communication network Gateway is XML.

In this embodiment, inbound messages from the communication network 120 are processed by the inbound message processor 116. In alternate embodiments, as illustrated in FIG. 3, both the inbound and the outbound messages are handled by the CMMP. In any system used, the processor must have the ability to unwrap and decode all message formats from any CFU 122 via any communications network 120 and update the database 112 appropriately. Also, the inbound message processor 116 can be configured to send and receive status, error or other kinds of messages to and from the user's pager 104. The format and amount of information of the inbound and outbound messages can vary depending upon which network is being used. The field equipment 124 can have various hardware configurations that feed into the CFU 122; however, the messaging protocol must be specifically selected to insure compatible with the server's 112 protocol. These standard protocols are used by the field units and the central server to insure that all messages are encoded/decoded properly. The type of protocol or information format, however, does not limit the type of sensors, input/outputs or other information transmitted. In fact, as long as the equipment protocol is known, the provider's server 100 can be configured to communicate with any remotely located equipment, including, but not limited to, other computers or a network of computers.

Figure 2:
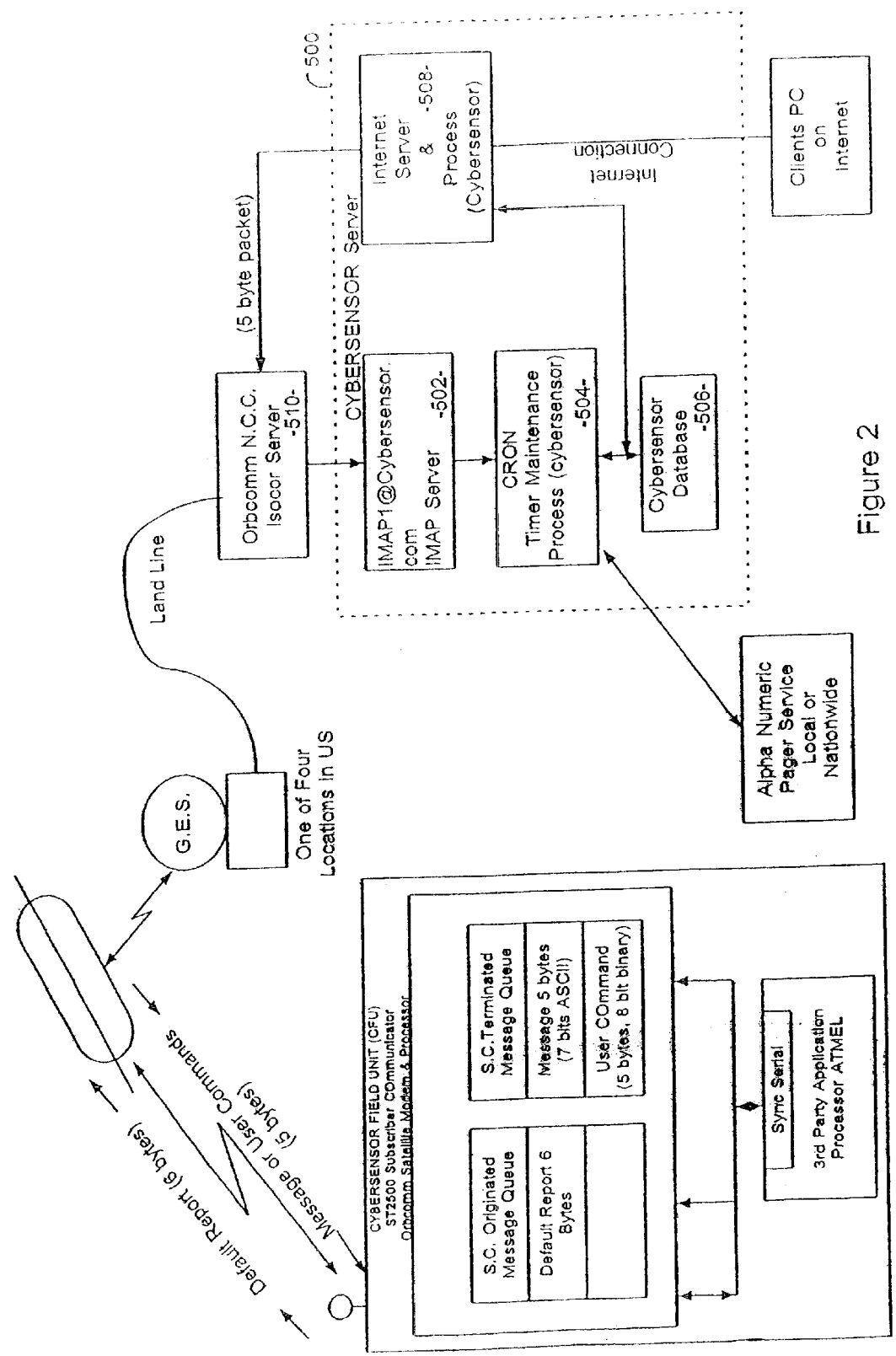
FIG. 2 is a flow chart of the system hardware and data flow using LEO satellite.

FIGS. 2 and 3 illustrate two alternative internal methods of handling the data transfer. In FIG. 2 the Orbcomm N.C.C. Isocor Server 510 is used as a direct gateway for the Cybersensor server 500. The data received from the Orbcomm server 510 is relayed to the Cybersensor IMAP server 502 and then to the CRON timed maintenance 504. The CRON 504 is a script application that runs on a timed basis, managing all incoming messages. Depending upon the program scheduling, the remote unit will periodically transmit data to the server 550. The CRON 504 takes the incoming messages and updates the database 506. The CRON 504 further sends messages to the user's pager service, or other notification device, to notify the user of a critical error. The Internet server 508 handles the outgoing messages, as received from the user. Thus if a user requests an update, the request is transmitted from the Internet server 508 to the Orbcomm server 510 to the remote unit. The returning data is sent from the remote unit to the IMAP server 502 to the CRON 504 where it is placed into the database 506. The updated data is then accessible from the database 506 by the Internet server 508 upon submission of a request by the user.

In FIG. 3, any IP Gateway 552 is used to connect the Cybersensor server 550 to various available networks 554. In this embodiment, the CRON 504 of FIG. 2 is replaced by the Message Management Process 556 to handle the incoming data from the remote units. The outgoing requests made by the user are also sent to the message management process 556, providing additional tracking advantages. This system further provides the advantage that any gateway can be used, rather than an Orbcomm specific. In this embodiment, the message management processor runs continuously and is therefore able to handle messaging tasks immediately. This enables the provider software to group and time transmissions in order to optimize satellite time. As stated theretofore, the system uses several modules to provide processing and storage of data as well as efficient access to the connected remote sites. It should be noted that the modules disclosed herein are example core modules and additional modules can be used for both internal data handling and user storage and retrieval.

Figure 5:
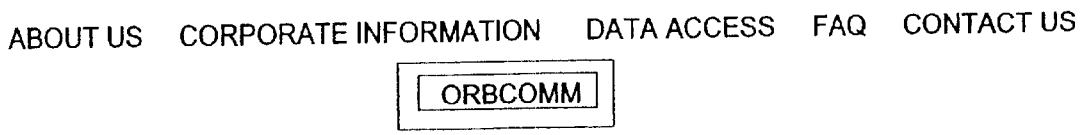
FIG. 5 is an example of a login screen.

Module 1, known as CyberLogin 110, is the first point of entry to the system, as illustrated in FIG. 5. This module is responsible for establishing a secure (encrypted/decrypted) link to the user's web browser and authenticating the user. Alternatively, an entry web site 108, an example of which is illustrated in FIG. 4, can be established so that it enables the user to access various other information from the provider, as well as take the user to the login screen 110. Although username 50 and password 52 security entries are common, the disclosed system preferably also requires a Customer ID 54 entry in the login screen 110. The three entries are preferred due to the separate levels of entry allotted within each company. Alternate methods of identifying the person entering the system, such as computerized ID chips, fingerprint recognition, etc. can also be used, dependent upon the current technology and systems available to the end user.

Three levels of data access; Administrative, Read/Write, and Read-Only are preferred and are generally controlled by the CyberLogin module 1. The access level is related to the username and password in the master system database. If there is a cost associated with using the communication link network, customers must be charged for their use of the system. In the disclosed examples, the system provider provides user access tokens in order for the customer and provider to monitor and record the numbers of data transfers to and from the remote field units. Each time a customer requests an update from the remote field unit using the virtual instrument panel, as illustrated in FIG. 6, they use an access token and when the new data arrives from the remote field unit, the system automatically deducts another token. A request to update a field or data parameter is accomplished clicking on the "UPDATE" button in CyberVIP or any other software module that allows the parameters to be updated. The "cost" can also be determined by the size or type of transaction message, time of request, frequencies of requests within a time period, etc. For example, a field unit report without a request from the user is a different charge than when the report is requested by the user, thereby creating a two-way transmission. The access tokens are tracked by the module and are displayed by a data access counter 80 of FIG. 7. In the disclosed illustrations the access counter 80 is displayed on the CyberVIP screen 118, however the current status of the tokens can be displayed on any page applicable, depending upon end use and/or user preference. Although the monitoring is handled by a module, or servlet, the usage data is stored within the customer's database. In order to provide the customers with additional tracking capabilities, specific access data can be stored for administrative reports, making available such items as the number of time a specific person requested information, the expense of automatic updates vs. manual updates, etc. Customers can be limited to the number of access tokens to prevent them from running up a communication link bill. In some instances, where the customer does not have any limits, the token count displayed on the access counter 80 can be the number of tokens used to enable the customer to trace the number of accesses. The following is an example of access privileges as well as how the access tokens are allotted to a customer, based upon data access level. It should be noted that this is an example only and in no way limits the system to the specific access abilities, reports available or the number of tokens. The administrative user "sees" all of the features of the Read/Write and Read-Only users with the addition of the administrative control panel (ACP) 212 as illustrated in FIG. 12. The ACP 212 allows the administrator to manipulate many of the system configuration parameters, change scheduled report times, rename and add remote units, define what constitutes an error message, etc. The administrative user has access to the ACP from CyberLOGIN, CyberVIP and CyberSTAT.

Administrative Access provides read/write privileges, giving them the ability to customize the parameters displayed on the virtual instrument panel. This level can be assigned, for example, 100 access tokens with the ability to purchase additional tokens automatically or manually.

Read/Write Access provides the ability to read current parameter values and change the parameter values. This differs from the Administrative level in that although parameter values can be adjusted, they are only adjustable within the customized parameters set in the Administrative Access. Further, the read/write access level cannot determine the parameters to be monitored. This level can be assigned, for example, 100 access tokens with or without the ability to purchase additional tokens.

Read-Only Access limits the accessibility to only reading the current values of the parameters. The read-only access is assigned 95 access tokens with or without the option of additional purchase.

The entry of the Username 50 causes module 1 to contact the database 112 to verify the existence of that name. The password 52 is similarly verified with the database. If more than one occurrence of the username and password exists in the master system database then the comparison of the Customer ID 54 is compared. If there is only one occurrence of the username and password in the database the Customer id 54 can be automatically obtained from the master system database or the system can be configured to force the user to enter a valid Customer ID. Once verification has been determined that the user is authorized, CyberSTAT is launched to allow the user to view the last reported status and statistics from database for all accounts, or field units, associated with the Customer ID.

Module 2, illustrated in FIG. 6, is a module program, known as CyberSTAT, which provides hotlink access to all of the user's remote field units, enabling CyberSTAT to be used as a very effective resource management tool. It accesses the database automatically and provides the user with error and statistical information on a line per unit basis. At a glance, the user can instantly identify a field unit that needs attention and navigate to it via a hotlink or know that all systems are working as programmed. Preferably the fields are color coded to allow for immediate recognition.

The user, with administrative level access, through the configuration editor, can add other features to CyberSTAT. For example from CyberSTAT, a person in the oil and gas industry can configure CyberSTAT to report the amount of oil or gas production from each well site. CyberSTAT also provides a "hot-link" access to the CyberVIP page that would then contain more detailed information related to each well site.

As illustrated in the screen 114 of FIG. 6, the CyberSTAT module 2 displays the unit name 62, a new report status 64, a last updated status 66, an error status 68 and a statistical graph 70 for each of the accounts, or field units, associated with the user's account. These are only example displays and other fields, specific to the industry, can be displayed. The module 2 illustrated in this Figure presents the information in a spreadsheet type format, although other formats can be used. The configuration editor can be used to select the presentation format or style. If the spreadsheet presentation style is used, the user can scroll up and down to access the entire list of field units. CyberSTAT automatically reads the latest information from the customer's master database and presents the information to the user. The time periods between system's updating can vary dependent upon the customer's accessing patterns and can be changed by the customer to accommodate a change in access patterns. For example, customers with constant on-line access can have the module 2 page constantly displayed on a dedicated screen. In these situations, the module 2 would search for updated material periodically, as programmed by the user. For customers who go on and off line, module 2 would present the new data upon verification of the customer ID numbers after the user logs into the system. These are only two examples of the versatility options that can be included in the program.

Figure 8:
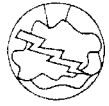
FIG. 8 is another example of a virtual instrument panel.
Figure 9:
FIG. 9 is an example screen of the error reporting control panel.

In some cases, the information will be color coded to indicate, at a glance, to the user that a field unit is in a particular state or if a sensor has exceeded a preset limit. For example, in the error status column 60, a red "error" box 60A can be displayed if the field unit has reported an error condition. In the absence of errors from the field unit, a green "clear" box 60B is displayed in the error status column. An error condition can be acknowledged by the user from CyberVIP by entering into the error status screen of FIG. 9. Therefore, the next time CyberSTAT is launched the "error" message will be displayed as an "acknowledged" box 60C. In situations where the module 2 is constantly displayed, the change from "error" to "acknowledged" would be automatically changed when the database receives, processes the message and returns the acknowledged message. In the case where multiple users are monitoring the same CyberSTAT page, the acknowledge feature indicates to the users that someone has acknowledged the error. To view detailing information related to the error, the user can click on any of the boxes related to the field unit and Module 3 (CyberVIP), illustrated in FIGS. 7, 8 and 9, is launched. The user configuration module enables the user to change the text associated with the error condition. This allows other users of the system to better understand the error condition. In the module the user can view detailed error information that relates to the particular remote field unit. A field unit can be configured to monitor/control several individual instruments or devices. From CyberVIP, a user with read/write privileges can selectively enable/disable pages associated with alarm events/conditions from each individual device attached. For example, if a device A is known to be malfunctioning, the pager reporting can be disabled on device A only leaving the other devices able to report alarm conditions.

The last received report column 66 of Module 2 displays the last time that the remote field unit sent data to the service provider's server. The status column 64 informs the user whether or not there are new reports since the last date and time indicated in the last received report column 66. The "New Reports" indication tells the user which unit has sent new reports that have not yet been viewed by a user. From this screen, the user can click on the name of the specific unit to be viewed, or enter through other means, module 3, the CyberVIP 118, for more detailed information. The information provided in the summary screen of FIG. 6 serves as an example and other pertinent summary information can be included.

Figure 10:
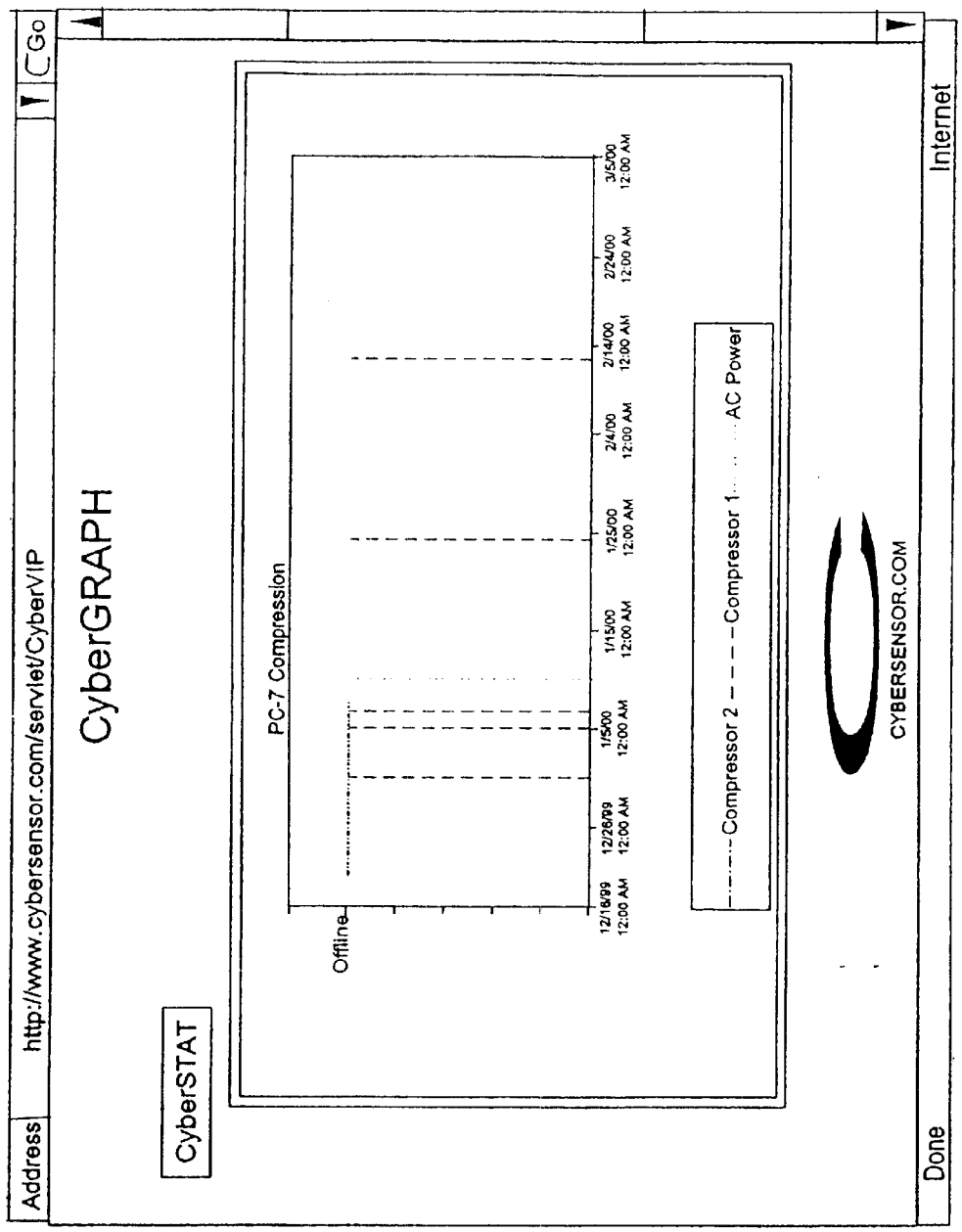
FIG. 10 is one example of the a graph produced in response to the Stats Graph of FIG. 6.
Figure 11:
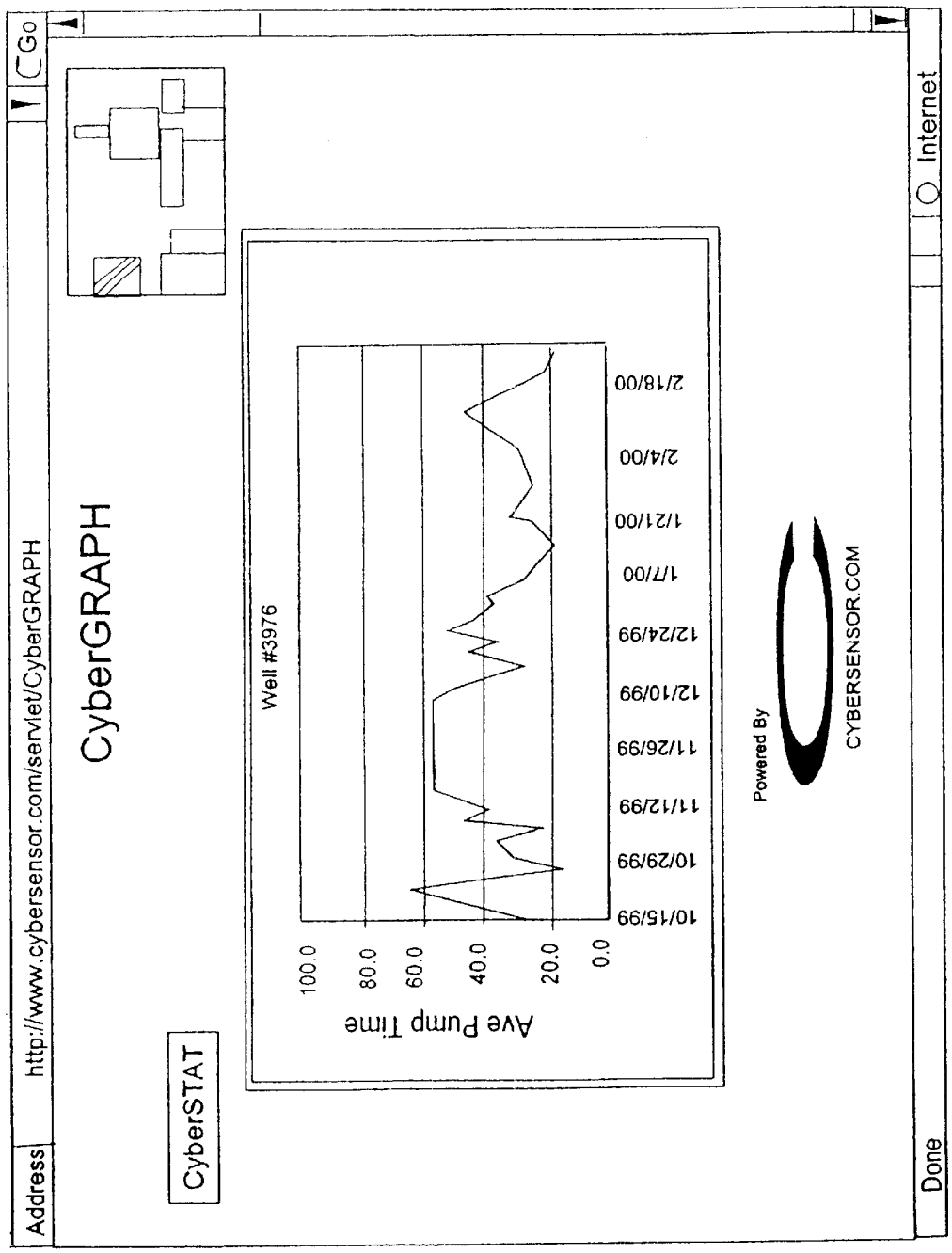
FIG. 11 is an alternate graph produced in response to the Stats Graph of FIG. 6.

The stats graphs column 70 provides the user with the ability to view and print graphical representation of the application functionality over a preprogrammed period of time. Two examples of graphs are illustrated in FIGS. 10 and 11, although other types of graphs, maps, etc. can also be incorporated, depending upon user preference.

The link provided in Module 2 will take the user to Module 3, illustrated in FIGS. 7–9, for the corresponding field unit. The CyberVIP screen 118 is field unit specific and displays complete and detailed information related to a particular unit. This screen displays all relevant information related to a field unit, including sensor values, such as but not limited to pressure, temperature, flow rate, liquid level, etc. Each of the parameters for the particular unit can be updated from this screen. An update can consist of an immediate request for up-to-date data or status information; or it can be a request to change or view the value of a field parameter. The system can further display geographical images or maps and position information sent from the field unit's Global Positioning System (GPS) receiver or calculated from Doppler positioning techniques. In addition to position, the status and/or value of any sensor or cargo can be also displayed. In the illustrated screen of FIG. 9, information such as the report and pager status is included as well as an overall "system" OK. These screens are only examples of the type of system checks and parameters that can be included and are, in no way intended to limit the scope of the invention.

The central field units 122 are fully programmable and can be configured to suit a variety of autonomous and semi-autonomous controller applications applicable to the specific field equipment 124. Each CFU can control and monitor multiple devices or equipment, such as, but not limited to, pumps, valves, etc. The CFU's can be configured to operate in several network configurations, i.e. to communicate directly to the satellite or terrestrial network, or communicate in a local area network (LAN) configuration with one of the CFU's acting as the wide-area-network (WAN) gateway. In addition to multiple network communication functionality, each unit has the ability to monitor sensors and control local equipment. In addition to automatically transmitting scheduled data updates, all field units 122 have the capability to automatically generate a report by exception (RBE). The RBE is generated from several kinds of conditions. For example, if a threshold, a minimum and maximum limit for a particular piece of field equipment 124, has been established in the field unit 122 for a particular input, and the limits on this input are exceeded, an RBE will be sent to the Cybersensor database. If configured for paging, the server can send a text page to the user describing the fault condition. If the paging service, or other method of notification, is bi-directional, the acknowledgment of the error condition can be sent to the CFU. The server will post the status of the error to the database and can be viewed from module 2 and/or module 3.

Module 3, or CyberVIP, as illustrated in FIGS. 7–9, generates the detailed report data. Module 3 is a separate module, or servlet, program that is executed on the web server, interacting with the database and sharing information with Module 2, CyberSTAT. CyberVIP acts as a virtual instrument panel for each field unit, displaying a list of all programmable field unit parameters, analog inputs, digital inputs, digital outputs, detailed error reports, status information and various field unit specific data such as oil production or pump activations. CyberVIP can be also be used to easily send or update information contained in field unit. To update information in the field unit, the user can type a new value in the box titled "New Value" and press "Update". The new value is then sent to the field unit and confirmation of the change is returned to the server. When the confirmation report is received from the field unit, the server will display the current "Value" which should reflect the submitted "New Value" that was sent to and received from the field unit 122. If the "value" is unacceptable to the user, a "New Value" can be resent to the field unit. For example, if the minimum operating temperature of the field unit is determined to be unsafe, the minimum temperature parameter can be set to a safe level ("New Value"). When the unit's temperature exceeds the minimum safe level, the unit will automatically power down. The provider's system preferable includes a set of commands that can be sent from the server to the CFU to shut-down a piece of equipment for a predetermined period or permanently if desired. This provides a safety feature, as well as economic advantage to the user.

Unit conversions for each value are preferably automatically calculated by the server prior to the data being displayed by CyberSTAT module 2 or CyberVIP module 3. For example, if the user is monitoring a pressure transducer, the units are displayed in PSI. The conversions are based on the multiplication factor and offset values that are stored in the preprogrammed plug-n-play sensor list on the database. The type of unit, i.e. PSI, hours, etc., is automatically determined by the type of application entered from the pull down list 222 in FIG. 13. An override is provided in the event the user wishes to change the unit. The conversion factors can be loaded into the database via an automatic sensor identification process, manual section of the sensor from an approved list of sensors, or manually loaded into the database. This capability adds value, above and beyond any existing technology, by allowing all user's to benefit from the expansion of central server's plug-n-play sensor list. For example, if a new sensor is added to the plug-n-play list, the user can simply plug the sensor into the remote field unit and remotely select the corresponding sensor from the plug-n-play sensor list in the user configuration module. A graphical representation of the field unit's inputs/outputs can be displayed during the sensor selection process. This can assist the user in relating the physical connector position with the kind of sensor that is connected to it. If an intelligent sensor is used the system will automatically report the kind of sensor that is installed with no input/setup is required from the user other than plugging in the sensor itself.

It is through this module 3 that the access levels are applicable. The read/write access level is, within this module 3, able to request updates on any parameter or change parameter values. If the user has read-only access, they can only request updates and view information. In addition to the read/write access privileges, a user with administrative level access can also launch the configuration editor 212 of FIG. 12. The configuration editor 212 allows the user to completely customize CyberSTAT and CyberVIP by enabling the selection of sensor types, custom labeling and titles and formatting the way the data is presented as shown in the Figures and charts illustrated herein. The administrator can either run the configuration wizard from a local client software package such as Microsoft Access or it can be executed in the form of a servlet requiring no software other than the web browser on the user's computer. The administrative user can select from a multitude of capabilities, selecting or deselecting various parameters needed for telemetry and/or control of the field unit. Many generic features can be combined to accomplish a variety of configurations. If the generic features are not sufficient, the field unit can be custom programmed and the web configuration tailored to fit most any application. For example, if the administrative user only wanted users to view the analog inputs on a field unit, all other available parameters could be hidden from view in the configuration editor. This is done to make the system as simple to use as possible. Once configured, the Administrative, Read/Write and Read-Only users will be able to view the same information. The administrative user can also configure the units, such as PSI, that are to be displayed for each parameter by choosing a sensor from the approved plug-n-play sensor list and selecting the proper units to be displayed. Once a sensor is chosen, the appropriate unit conversions are automatically calculated and displayed as configured by the user via CyberVIP.

A time/date stamp is associated with each parameter to notify the user when the last time a specific parameter was updated. The parameter time/date stamp 78 can be different than the last updated field 66 of module 2, since the last updated field 66 reflects the time/date of any update rather than any specific parameter update. Due to the costs associated with the satellite time, it is preferable that each parameter be updated individually either upon request or on a preprogrammed time basis. If enabled, the automatic report interval for a parameter can be programmed from CyberVIP. The remote field unit will generate an automatic report at a given maximum time interval or at a given time of day. This report interval can be locked or unlocked by the Administrative user from the configuration editor. The variable report interval helps to eliminate unnecessary network traffic or over reporting or under reporting.

The link between the web site and the remote equipment is most advantageously through a satellite link. In the optimum configuration, a centralized remote computer is connected via wireless technology to the satellite system provider's server. The satellite network server is connected to a central database/web server that distributes information via the Internet to the end user or end-user's local server. It should be noted that once a transaction or update has been requested by the user, the server takes over the responsibility of making sure that transaction takes place. Once submitted, the user has the option to go offline or stay online as desired. If the system is unable to verify communication with the satellite, the operating software is programmed to repeat the communication process until the transmission is acknowledged. In instances where the satellite has responded to a send query that the system should wait until a specific time for transmission, the system will commence sending at the designated time. At that time, if a transmission is not completed, the system will continue to send until the transmission is acknowledged. For optimum power conservation, the remote system can be programmed to cycle power. In this configuration, the remote system can be programmed to power-up the communication receiver at a predetermined time of day. In this mode, the server can be programmed to attempt communication with the remote system during the time of day that it's receiver is activated.

The satellite transmits each request from the web site to each corresponding remote site or centralized remote computer. The remote site computer serves to process the requests and to control or operate the remote site. In order to reduce cost, it may be preferable that the remote units be connected to one another in a local area network configuration; however, in situations where this is not possible the satellite will communicate with each individual or groups of remote computers. For ease of explanation, reference will be made to each site having a separate CFU, however, as stated, this should not limit the scope of the application.

The remote site computer (CFU) accepts the satellite-transmitted request and processes the request. The request can be to update all or selected parameters, in a standard preprogrammed report format, as for example, all or part of the data contained in the CyberVIP Module 3 of FIG. 7. The request can also, for example, instruct the computer to commence or terminate a process cycle, turn on or off equipment, or request position, sensor values or general status information. Position reports resulting from a position request can be derived from internal GPS or Doppler position technology or external GPS or other position detection methods. The remote computer complies with the request and transmits the updated data or response to other request (s). Economic efficiency can be achieved on the remote units by using an integrated application processor that resides on the same printed circuit board as the communication processor. The receiver/transmitter, or transceiver, can be a radio frequency transmitter of the type sold by Stellar Satellite Communications, Ltd, of Virginia. The radio frequency satellite radio has the advantage over microwave transmitters of being omni-directional and thus not requiring a parabolic dish. Once the satellite network receives the transmission, a transmission-received signal is sent to the remote computer to verify that the transmission was successful. If the remote computer does not receive the transmission-received signal in a preprogrammed period of time, the remote computer contacts the satellite network and retransmits the response. This procedure is repeated until the satellite acknowledges and accepts the transmission. This request for verification is preferable whether the original transmission is generated at the provider's server or the CFU.

The communication between the CFU and satellite can include any number of instructions programmed into the remote computer, for example the user can define that the data be transmitted after a specified time delay or during a specified time period. This functional capability serves to optimize the utilization of the satellite and can reduce power needed by the remote field unit by spreading activities over an extended time period or deferring transmission to periods of low demand for satellite time.

The operating software is written to produce a generic virtual instrument panel. By generic, it is meant that the virtual instrument panel is not application specific but rather can be adapted for use by any system. As for example, using an application specific template, an environmental monitoring company using the disclosed system would incorporate different parameters into their virtual instrument panel than an oil producing company. The data, labels and titles would be different but the program of the virtual instrument panel can be the same. This kind of versatile programming of the virtual instrument panel enables the applications to be unlimited and development time to be minimal. The administrative user can either manually set-up the virtual instrument panel or select from a variety of default industry specific virtual instrument panel templates. Even though the servlets are not user programmable, they are completely configurable. The way that the servlets present information to the user is customizable via the configuration editor. For example, if a customer wants to monitor fluid level in a tank from anywhere in the world, the remote access system provides the user interface that will enable the appropriate sensors at the remote location to be monitored to accomplish this task. Once the equipment is installed in the field, the customer will have access to such information, as for example, the level of fluid in a fuel tank, through the virtual instrument panel module 3. The titles displayed will reflect the actual name of the tank or contents and the level units can be displayed in feet or meters, etc.

As well as accommodating a variety of users, the disclosed system can accommodate various sizes of businesses by dividing the system into levels or packages. For example, if the customer purchased a first type package, they would receive customization privileges and 100 access tokens/month, paying a monthly fee to maintain continuous access to the remote field unit's data. Another type of package would be one that provide unlimited access and customization privileges. A low-end package might provide only daily access and no customization privileges.

All of the examples use the following sequence to enter the system site:
1. The customer logs on to a remote access system web site.
2. They can choose from the following selections:
   a. WHAT'S NEW (discusses new and/or updates technology issues at Remote access system)
   b. PRODUCTS (discusses remote access system products and technology)
   c. SERVICES (discusses services provided by remote access system such as virtual instrument panel, equipment installation, engineering consultation, etc . . . )

d. DATA ACCESS (link to CyberSTAT and CyberVIP: Virtual Instrument Panel).
e. CONTACT US (information about contacting Remote access system by phone, mail, or e-mail)
3. A customer selects DATA ACCESS.
   a. Enters User Name, Password and Customer ID.

EXAMPLE I

The following example sets forth a view only generic system, without the incorporation of any specific parameters.

1. A customer purchases the remote access system technology (virtual instrument panel). The remote computer equipment and software is installed in the field. For example, if the system is to monitor and report power outage, the only installation necessary is to plug the unit in and mount the antenna. Through the Internet, they now have access to data from their remote site.

2. CyberSTAT screen is displayed showing customer site, status, last update and error status.

3. The user selects the desired site.

4. CyberVIP presents the virtual instrument panel of the field unit.

5. The user is able to view the report displaying the parameters, current units and the last update date/time log.

EXAMPLE 2

The following generic example illustrates a typical read/write level access.

1. A customer purchases and installs the service provider's hardware and executes an agreement to pay the service provider a monthly fee for system access. An existing corporate computer system, which is assumed to be already connected to the Internet via a local internet service provider, is used as the user's interface to the system. Through the Internet, with proper username, password and customer id, they are now in communication with their remote site.
2. The customer logs on to the remote access system web site.
3. A screen is displayed showing customer site, status, last update and error status.
4. The user selects the desired site.
5. The virtual instrument panel is displayed.
6. The read/write access level, recognized by the system in step 5, enables the user to change the parameters and, if necessary, enter new parameters, to the system.
7. The virtual instrument panel will display two text boxes for each parameter unless the parameter is an sensor output only. A first box for the current value and a box for the new value or desired value. The box for the current value will also show the last date/time updated.
8. A new value may be entered in the new text box. When the update button is selected, the new value is sent to the servlet on the primary site for processing. The servlet sends the data over the communication link network to the controller on the system. The controller makes the changes to the parameters and sends back verification of the new parameter value over the communication link network. The servlet receives the data, sends it back to the virtual instrument panel, and replaces the data in the "current value" text box for that particular parameter.

EXAMPLE 3

The following illustrates the generic administrative level access.
1. A customer purchases the remote access system technology (virtual instrument panel). The appropriate corporate and remote computer equipment and software is installed on their system. Through the Internet, they are now in communication with their remote site.
2. The customer logs on to a remote access system web site.
4. A screen is displayed showing customer site, status, last update and error status.
5. The user selects the desired site.
6. The virtual instrument panel is displayed.
7. The administration access level, recognized by the system in step 5, enables the user all of the foregoing accesses plus the ability to customize the parameters.

It should be noted that the CyberLogin, FIG. 4 can be "hot linked" directly from another web site. This could be the customer's Intranet site or a system's integrator's site. Since the Remote access system servlet technology enables dynamically generated data access HTML pages, the customer is able to use the technology without having to be aware of the technology employed.

EXAMPLE 4

An oil producer has purchased Remote access system technology with administrative privileges to gain access to important data at their well sites.

The following list describes the steps taken by the oil producer in order to access well data:
1. Logs on to the Internet,
2. Select DATA ACCESS from the home page.
3. Based on the Customer ID, User Name and Password entered, a servlet will display a map of the US with highlights on the states where that particular oil producer has wells. The servlet will also generate a pull-down menu listing all of the wells that the oil producer has access to.
4. Select state of interest from the highlighted states by clicking the state of interest.
5. The state map is divided into counties or railroad commissions with the counties containing wells owned by the customer highlighted.
6. The well to be accessed is selected from a list of wells located in that section.
7. The virtual instrument panel for that well will display current parameter values such as max. pump time or well production information along with a last updated date/time stamp.
8. To change a value, enter new value into textbox and select UPDATE.
9. The servlet will receive the new value, send this information through the communication link network to the well site and wait for a response from the controller.
10. The response is received by the servlet, processed and re-displayed on the virtual instrument panel with a new date/time stamp.

EXAMPLE 5

A HVAC equipment manufacturer has purchased Remote access system technology with administrative privileges to gain access to important data where their conveyor systems have been installed.

The HVAC equipment manufacturer will access their data by following the same steps as shown above for the oil producer. The only difference between the two virtual instrument panels would be the titles of the parameters shown. The conveyor producer will customize their virtual instrument panel to display parameters such as motor temperature instead of bore-hole gas pressure.

As can be seen from the foregoing, the disclosed system provides a company with a secure method of monitoring remote sites using the Internet.

What is claimed is:

1. A method of monitoring of at least one remote equipment using a monitoring system, comprising the steps of:
   a. establishing, for at least one user at at least one first location, a customer account in said monitoring system, said monitoring system having software comprising an application program and a database, located at a second location, said customer account having multiple user IDs to enable activation of multiple levels of access servlets;
   b. establishing communication from each of said at least one remote equipment at at least one third location to at least one field unit located at at least one third location, each of said at least one field unit having two way communication with said monitoring system;
   c. activating multiple servlets within said monitoring system by said at least one user, said multiple servlets being a plurality of preprogrammed independent action modules that interface between said at least one user and software in said monitoring system;
   d. activating a first of said plurality of action modules to logon to said user account;
   e. activating at least one of said plurality of action modules to communicate with said software to enable a user to perform at least a plurality of the functions of fetching, displaying, defining, redefining and saving data, based upon user access level,
   f. limiting said user interaction to said plurality of action modules within said monitoring system and precluding user access to said software in said monitoring system.

2. The method of claim 1 wherein said user overrides initially preprogrammed defaults in said monitoring system to define and redefine within said at least one field unit, individual data parameters for said at least one remote equipment comprising the steps of:
   a. selecting at least one of said plurality of action modules to permit access to said user's account at a level to enable said user to define displayed data from said at least one first location for said at least one remote equipment at said at least one third location;
   b. selecting at least one of said plurality of action modules to define displayed information for said at least one remote equipment;
   c. defining data parameters for said at least one remote equipment including report scheduling;
   d. setting operational data for said field unit, said operational data including minimum and maximum base values for said at least one remote equipment;
   e. selecting an action that activates at least one of said plurality of action modules to transmit each of said data parameters and said operational data to said monitoring system to be saved in said user' account,
   f. communicating said data parameters and said operational data to a field unit communicating with said at least one remote equipment;
   g. storing said operational data and said data parameters at said field unit;
   h. monitoring within said field unit the current values of said data parameters within each of said at least one remote equipment connected to said field unit;
   i. comparing said current values with stored base values;
   j. repeating steps h and i based on a reporting schedule;
   k. transmitting from said field unit to said monitoring system said current values based upon said report scheduling.

3. The method of claim 2 wherein said operational data includes minimum and maximum base values for said at least one remote equipment.

4. The method of claim 2 wherein said user interactively monitors data for said remote equipment comprising the steps of:
   b. selecting at least one of said plurality of action modules to permit access to said user's account at a level to enable monitoring said displayed information at said at least one first location for said at least one remote equipment at said at least one third location;
   c. selecting an action that activates at least one of said plurality of action modules to display current values, data parameters and additional action modules to be activated for a first of said at least one remote equipment;
   wherein said user monitors said current values through activation of at least one of said plurality of action modules without direct interaction with said software.

5. The method of claim 1 further comprising the step of said field unit transmitting a message to said monitoring system, outside of said reporting schedule, that said current values are outside of base values.

6. The method of claim 5 further comprising the step of said monitoring system notifying a user's notification device upon receipt of said message.

7. The method of claim 1 further comprising the step of selecting at least one of said plurality of action modules to display data on a summary page, said summary page being linked to at least one other of said web pages.

8. The method of claim 7 further comprising the step of selecting at least one of said plurality of action modules to list status data for all remote units on said summary page.

9. The method of claim 1 further comprising the step of selecting at least one of said plurality of action modules to display data parameters on a detailed data page, said detailed data page being linked to at least one other of said web pages.

10. The method of claim 9 further comprising the step of selecting at least one of said plurality of action modules to list predetermined detailed data parameters for one of said at least one remote unit on said detailed data page.

11. The method of claim 1 further comprising the step of selecting at least one of said plurality of action modules to display data on an error page, said error page being linked to at least one other of said web pages.

12. The method of claim 11 further comprising the step of selecting at least one of said plurality of action modules to display said detailed data page lists from each of said at least remote equipment on said detailed data page.

13. The method of claim 1 further comprising the step of selecting at least one of said plurality of action modules to display data on a data configuration page, said data configuration page being linked to at least one of said web pages.

14. The method of claim 13 further comprising the step of selecting at least one of said plurality of action modules to define parameters for each of said remote equipment displayed on said data configuration page.

15. The method of claim 1 further providing the step of said monitoring system contacting each of said field units to transmit updated data received from each remote equipment based on a predetermined schedule.

16. The method of claim 1 further comprising the step of said field unit initiating a configurable, preprogrammed action regarding said at least one remote equipment operation upon receipt of data from said remote equipment outside of said user definable maximums and minimums.

17. The method of claim 1 further comprising the step of activating at least one of said plurality of action modules to access data from said field unit upon demand.

18. The method of claim 1 wherein said monitoring system comprises operating software, said operating software having an application program and a database to perform at least one of the functions of storing, sorting and displaying data and communication capabilities, said communication capabilities being configurable and enabling communication between said at least one user at said at least one first location and said central server and between each of said at least one remote unit at said at least one third location and said central server.

19. The method of claim 1 wherein said at least one remote equipment is a sensor.

20. A method of monitoring of at least one remote equipment using a monitoring system, comprising the steps of:
  a. establishing, for at least one user at at least one first location, a customer account in said monitoring system located at a second location, said monitoring system having operating software having an application program and a database to perform at least one of the functions of storing, sorting and displaying data and two way, configurable communication capabilities, said customer account having multiple user IDs to enable activation of multiple levels of access servlets;
  b. establishing communication between said at least one remote equipment located at at least one third location and at least one field unit at said third location, said field unit having two way communication with said monitoring system,
  c. activating multiple servlets within said monitoring system by said at least one user, said multiple servlets being a plurality of preprogrammed independent action modules that interface between said at least one user and software in said monitoring system;
  d. activating a first of said plurality of action modules to logon to said user account;
  e. activating at least one of said plurality of action modules by said user and communicating with said software in said monitoring system through said action module to enable said user to perform at least a plurality of the functions of fetching, displaying, defining, redefining and saving data, based upon user access level,
  f. limiting said user interaction to said plurality of action modules within said monitoring system and precluding user access to said software,
  g. selecting at least one of said plurality of action modules to permit access to said user's account at a level to enable said user to override initially preprogrammed defaults to define displayed data format at said at least one first location for said at least one remote equipment at said third location;
  h. selecting at least one of said plurality of action modules to define information to be displayed for each of said at least one remote equipment;
  i. defining parameters for each of said remote equipment including report scheduling;
  j. setting operational data for said remote field, including minimum and maximum base values for said remote equipment;
  k. setting set points in said field unit;
  l. setting a reporting schedule for said at lease one field unit;
  m. selecting an action that activates at least one of a plurality of action modules to set at least one of said report schedule, said field unit set points, said data parameters and said base values within said monitoring system to be saved in said user' account;
  n. communicating to said field unit in communication with said at least one remote equipment at least one of said report schedule, said field unit set points, said data parameters and base values;
  o. storing at least one of said report schedule, said field unit set points, said base values and said data parameters at said field unit;
  p. comparing said current values with said stored base values;
  q. repeating step 'p' based on a reporting schedule;
  r. transmitting from said field unit to said monitoring system said current values, in accordance with said report scheduling when said current values fall within said base values, and outside of said reporting schedule when said current values fall outside of said base values;
  s. monitoring data for said remote equipment by said user through accessing said plurality of action modules to access and display multiple pages of information for each of said remote equipment, each of said multiple pages of information being linked to at least one additional page of information and only accessible through said action modules;
  wherein said user monitors said current values and data parameters through activation of at least one of said plurality of action modules without accessing said software.

21. The method of claim 20 further comprising the step of said at least one user activating servlets to activate a request for data from said at least one field unit outside of said reporting schedule.

22. A method of monitoring of at least one remote equipment using a monitoring system, comprising the steps of:
  a. establishing, for at least one user at at least one first location, a customer account in said monitoring system located at a second location, said monitoring system having operating software having an application program and a database to perform at least one of the functions of storing, sorting and displaying data and two way, configurable communication capabilities, said customer account having multiple user IDS to enable activation of multiple levels of access servlets;
  b. establishing communication between said at least one remote equipment located at at least one third location and at least one field unit at said third location, said communication including said field unit initiating a configurable, preprogrammed action regarding said at least one remote equipment operation upon receipt of data from said remote equipment outside of said user definable maximums and minimums, said field unit having two way communication with said monitoring system, c. activating multiple servlets within said monitoring system by said at least one user, said multiple servlets being a plurality of preprogrammed independent action modules that interface between said at least one user and software in said monitoring system;

d. activating a first of said plurality of action modules to logon to said user account;

e. activating at least one of said plurality of action modules by said user and communicating with said software in said monitoring system through said action module to enable said user to perform at least a plurality of the functions of fetching, displaying, defining, redefining and saving data, based upon user access level, f. limiting said user interaction to said plurality of action modules within said monitoring system and precluding user access to said software;

g. selecting at least one of said plurality of action modules to permit access to said user's account at a level to enable said user to override initially preprogrammed defaults to define displayed data format at said at least one first location for said at least one remote equipment at said third location;

h. selecting at least one of said plurality of action modules to define information to be displayed for each of said at least one remote equipment;

i. defining parameters for each of said remote equipment including report scheduling;

j. setting operational data for said remote field, including minimum and maximum base values for said remote equipment;

k. setting set points in said field unit;

l. setting a reporting schedule for said at lease one field unit;

m. selecting an action that activates at least one of a plurality of action modules to set at least one of said report schedule, said field unit set points, said data parameters and said base values within said monitoring system to be saved in said user' account;

n. communicating to said field unit in communication with said at least one remote equipment at least one of said report schedule, said field unit set points, said data parameters and base values;

o. storing at least one of said report schedule, said field unit set points, said base values and said data parameters at said field unit;

p. comparing said current values with said stored base values;

q. repeating steps 'p' based on a reporting schedule;

r. transmitting from said field unit to said monitoring system said current values, in accordance with said report scheduling when said current values fall within said base values, and outside of said reporting schedule when said current values fall outside of said base values, s. monitoring data for said remote equipment by said user through accessing said plurality of action modules to access and display multiple pages of information for each of said remote equipment, each of said multiple pages of information being linked to at least one additional page of information and only accessible through said action modules;

wherein said user monitors said current values and data parameters through activation of at least one of said plurality of action modules without accessing said software.

23. The method of claim 22 further comprising the step of said at least one user activating servlets to activate a request for data from said at least one field unit outside of said reporting schedule.

* * * * *